United States Patent [19]

Liehr

[11] Patent Number: 5,683,633
[45] Date of Patent: Nov. 4, 1997

[54] PROCESS AND DEVICE FOR TEMPERING MOLDING TOOLS FOR PROCESSING PLASTICS

[75] Inventor: Erich Liehr, Hermsdorf, Germany

[73] Assignee: Kunststofftechnik F. u. H. Riesselmann GmbH, Ottendorf-Okrilla, Germany

[21] Appl. No.: 532,747

[22] PCT Filed: Mar. 19, 1994

[86] PCT No.: PCT/DE94/00334

§ 371 Date: Sep. 25, 1995

§ 102(e) Date: Sep. 25, 1995

[87] PCT Pub. No.: WO94/22656

PCT Pub. Date: Oct. 13, 1994

[30] Foreign Application Priority Data

Mar. 26, 1993 [DE] Germany ............ 43 09 880.0
Feb. 23, 1994 [DE] Germany ............ 44 05 711.3

[51] Int. Cl.[6] .................. B29C 45/78; B29C 45/73
[52] U.S. Cl. .................. 264/40.6; 264/328.16; 364/475.07; 425/144; 425/552
[58] Field of Search ................... 264/40.1, 40.6, 264/328.1, 328.16; 425/143, 144, 160, 170, 547, 552; 364/475.05, 475.07

[56] References Cited

U.S. PATENT DOCUMENTS

| 4,420,446 | 12/1983 | Wieder et al. | |
|---|---|---|---|
| 5,034,168 | 7/1991 | Matsumoto et al. | 264/40.1 |
| 5,397,515 | 3/1995 | Searle et al. | 264/40.6 |
| 5,411,686 | 5/1995 | Hata | 264/40.6 |

FOREIGN PATENT DOCUMENTS

| 0 218 919 | 4/1987 | European Pat. Off. | |
|---|---|---|---|
| 203 011 | 10/1983 | Germany . | |
| 62-085916 | 4/1987 | Japan . | |
| 62-279917 | 12/1987 | Japan . | |
| 101 8 620 | 1/1989 | Japan . | |
| 02 136 219 | 5/1990 | Japan . | |
| 484 711 | 3/1970 | Switzerland . | |

OTHER PUBLICATIONS

WO 92/08598 Evans May 29, 1992.

Plastverarbeiter, vol. 35, No. 5, May 1984, pp. 74/81 Kotzab "Exakte Temperierung ... ".

Kunststoffberater, vol. 30, No. 6, Jun. 1985, pp. 22–25 "Fachbeitrag: Formtemperierung durch ... ".

*Primary Examiner*—Jill L. Heitbrink
*Attorney, Agent, or Firm*—Collard & Roe, P.C.

[57] ABSTRACT

The tempering process is divided in two phases, a start-up phase and a stationary operating phase, each having different tempering conditions, whereby the start-up phase is completed after the preset nominal tool temperature has been reached or exceeded for the first time, and the meantool temperature is continuously measured during the entire cycle duration at a precisely defined site, and whereby at time $Z_2$, the latter being fixed by a signal of the machine sequence control, a cooling medium impulse, the latter taking into account the tempering in the preceding cycles, is induced close in time to the injection process in order to effect the required heat dissipation within the time range of the greatest temperature difference between the injected melt and the cooling duct, and further cooling medium impulses are induced as the result of a should be-actual comparison occurring at time $Z_2$ if the preset nominal temperature is exceeded, whereby the time $Z_2$ is fixed by a signal of the machine sequence control, such signal being triggered at a defined time close in time to the end of the cycle.

19 Claims, 2 Drawing Sheets

PROCESS AND DEVICE FOR TEMPERING MOLDING TOOLS FOR PROCESSING PLASTICS

BACKGROUND OF THE INVENTION

1. Field of the Invention

The invention relates to a process for tempering molding tools for the processing of plastics, in particular injection molding tools, and to a device for carrying out the process.

2. Prior Art

In injection molding, the tool temperature is one of the most important thermal quantities of function, in addition to the cylinder and melt temperatures. It has a large influence on the flowability of the plastic melt, the cycle time, and the quality of the molded parts, in particular on the surface quality, the shrinkage, and the distortion. Various processes for the tempering of injection molding tools are already known. Heretofore, only the operating method using tempering appliances found general acceptance.

A first variation consists in accommodating the tempering appliance in the injection molding machine ("Plaste und Kautschuk" 1982, No. 2, page 86). Hence the tempering appliance is located within the immediate proximity of the tool in order to avoid heat losses on account of the conduit system. Said solution leads to low space requirements for setting up the injection molding machine; however, the basic drawbacks of said tempering method continue to exist. These include primarily the energetically unfavorable operating method and the high acquisition cost for the tempering appliances.

A process is known from DD-PS 203 011, in which the cooling phase is interrupted following the injection process, whereupon a tempering phase takes place, followed by another cooling phase, which has to lastlong enough for the residual energy content of the molded part to suffice for heating the injection molding tool to a temperature that is favorable for the subsequent injection molding cycle.

The drawback of said process is mainly that technologically conditioned differences in the heat discharge of the individual cooling phases at the start of the manufacturing process have to be manually balanced by throttling the flow of cooling water on the set valves in different ways, or by controlling the duration of the cooling phases by varying the adjustment of adjustable time relays. This requires a considerable expenditure of work and makes greater demands on the operating personnel. Furthermore, with said process, as with conventional tempering devices, unavoidable interferences with the manufacturing process such as, for example, variations in the cooling water temperature and in the cooling water through-put, changes with respect to the temperature, in particular the temperature of the melt, and with respect to the cycle time cannot be controlled with respect to their energetic effect on the quality of the molded parts. Depending on the size of the energetic effect of such quantities of interference, the thermodynamic condition of the tool can change to a more or less greater extent, and differences in quality may occur in the manufactured molded parts, leading to reject loss.

U.S. Pat. No. 4,420,446 specifies a process for controlling the tool temperature in injection molding. In this connection, a selected control temperature is preset as the nominal temperature. The tool temperature is measured within the immediate proximity of the molding nest. The valves of the cooling circulation are opened or closed depending on whether the nominal temperature is exceeded or falls short of the nominal value. In addition, when preset upper and lower limit temperatures are exceeded or not reached, visual and sound warning signals are emitted.

A similar solution, in connection with which the heat supplied to the melt is to be exploited for tempering the tool wall, is described in trade publication "Plastverarbeiter" 1984, No. 5, pp 77 to 80. Tempering is controlled here by a microprocessor; the temperature increase caused by the introduction of the melt is measured on the tool contour via a thermosensor, and the microprocessor controls (in dependence on the measurement) the opening time of the magnetic valve system for the cooling water feed. A so-called impulse cooling takes place, and the tool assumes the function of the heat exchanger.

Said known methods, which are based on the same principle, have the following drawbacks:

The great closeness of the temperature sensors to the contour of the tool, thus to the hottest zone of the tool, necessarily leads with each injection process and also during start-up to an exceeding of the nominal temperature and thus to triggering of cooling.

Tempering in sole dependence upon the instantaneously measured temperature leads, with the always-present inertia of the thermal compensation between the melt and the melt, as well as between the cooling medium and the tool, to a shift in time of the tool tempering, and thus to tool temperatures that are clearly below or above the selected control temperature.

Both interference factors in the injection molding process, e.g. a reduced offer of tempering medium and the unfavorable position of cooling surfaces relative to the contour of complicated tools, are not compensated by said methods, and adaptation of the tempering conditions to the instantaneous process parameters is not possible. As opposed to the conventional tempering process, the reject quota, the cycle time and the energy consumption cannot be reduced.

SUMMARY OF THE INVENTION

The invention was based on the problem of creating a process for the tempering of molding tools in the processing of plastics, in particular of injection molding tools, which, taking into account the instantaneous parameters of the injection molding process including interferences occurring in the process, assures a sufficiently good adaptation of the mean tool temperature to a nominal temperature to be specified, with simultaneous self-regulating control, which process works without additional energy. Furthermore, in the presence of predetermined nominal temperatures that are outside the possible control range, an automatic correction of the nominal temperatures to a value within the control range is to be made possible. Moreover, the problem of the invention is to create a device suitable for carrying out the process.

According to the invention, the problem is solved in that the tempering process is divided in two phases, a start-up phase and a stationary operating phase, with different tempering conditions in each case, whereby the start-up phase is completed after the predetermined nominal tool temperature has been reached or exceeded for the first time, and the mean tool temperature is continuously measured during the entire cycle duration at the site for the respective cooling circulation, such site being equally acted upon thermally both by the injected melt and the cooling, whereby said site is located within the range of the geometric center between the contour of the molded part and the cooling ducts or cooling surface, and within the range of the center between the cooling water inlet and the cooling water outlet, with a sufficiently great spacing from the contour of the molded part; and a cooling medium impulse, the latter taking into account the tempering during the preceding cycles, is induced at a time $Z_1$, such time being fixed by a signal from the machine operation control, close in terms of time to the injection process, in order to effect within the time range of the greatest difference between the injected melt and the cooling duct the heat discharge required; and further cooling medium impulses are induced as a result of a should be-actual value comparison taking place up to a time $Z_2$ if the preset nominal temperature is exceeded, whereby the time $Z_2$ is fixed by a signal from the machine operation control, such signal being triggered at a defined time which, in terms of time, is close to the end of the cycle. During the start-up phase, an initial cooling $t_{init}$ having a fixed duration takes place during the first cycle, starting at time $Z_1$, in order to obtain a first complete flushing of the respective cooling circulation, and when a defined space is reached between the mean tool temperature and the preset nominal temperature, a fixed cooling impulse $t_{ann}$ having a shorter time duration is induced in the following cycle at time $Z_1$, whereby the cooling impulse $t_{ann}$ is induced in all following cycles until the preset nominal temperature is exceeded for the first time, and a dampened approximation of the mean tool temperature to the selected nominal temperature is assured.

A variation occurring as a special case during the start-up phase consists in that when a nominal temperature is preset that is below the measured actual temperature, continuous cooling takes place in all following cycles between times $Z_1$ and $Z_2$ until the measured actual temperature falls short of the preset nominal temperature for the first time. Following such drop below the nominal temperature, the start-up phase is continued with the induction of the cooling medium impulse of duration $t_{ann}$ at time $Z_1$ of the cycle following the first drop below the nominal temperature, and terminated when the nominal temperature is exceeded again.

In the stationary operating phase, the process according to the invention with its adaptive or "self-adjusting" control finds its expression in the continuously updated presetting of a calculated cooling medium impulse, on the one hand, and in a tempering phase depending upon the current should be-actual value comparison, on the other hand.

Based on the total duration of the cooling medium impulses of a fixed number of directly preceding cycles, the arithmetic mean of the cooling duration per cycle is determined via a connected data processor, with a factor $K_1$, which compensates the practically unavoidably occurring thermal disturbances for the temperature condition of the tool, evaluates them, and is used as the calculated impulse duration $t_E$ for introducing the cooling medium in the subsequent cycle at time $Z_1$.

Upon introduction of the cooling medium impulse of length $t_E$, the induction of further cooling medium impulses takes place as the result of the continuously executed comparison of the tool temperature for the duration over which the nominal temperature is exceeded at the given time, and thus temperature-dependent at the latest by time $Z_2$ of the actual cycle, the total duration of such further impulses being limited by the calculated maximum total duration $t_{max}$. The time duration of said cooling impulses of length $t_E$ is determined according to the following calculation formula:

$$t_E = \frac{K1(j)}{n} * \sum_{i=1}^{n} (t_{Ei} + t_{Vi}) \tag{I}$$

where n is the preset number of successive cycles, whose total cooling duration is to be included in the calculation of $t_E$ after the preset nominal tool temperature has been exceeded for the first time;

$t_{Ei}$ is the cooling impulse for the cycle i of the n-cycles;

$t_{Vi}$ is the sum of the temperature-dependent cooling impulses of cycle i of the n-cycles;

j is the number of cycles after the phase of stationary operation has started; and K1 (j) is the machine- and process-dependent quantity depending on j, which serves for evaluating the mean cooling time of the n-cycles and satisfies the following conditions:

$K1(j) = a_0 + a_1 * f$ for $j \leq n$ $K1(j) = a_2$ for $j \leq n$ $K1(j) < 1$, $K1(j+1) \geq K1(j)$ for all j's $a_0, a_1, a_2 \geq 0$, which means, K1(j) satisfies a straight-line equation for $j \leq n$ with $a_1$ as the increase, $a_0$ as the constant member, and with a strictly monotonously growing development within range $j \leq n+1$; for $j > n$, K1(j) is constantly $a_2$, whereby applies that $a_2 > a_0 + a_1 * j$ for $j \leq n$, and whereby it is assured that the sum of the cooling impulses up to cycle n is included less weighted in the calculation of $t_E$ than after n has been reached, and the following starting conditions starting with cycle 1 of the stationary phase apply to the calculation:

(1) $t_{Ei} = t_{ann}$ (2) The calculation of (I) is made for j<n by substituting j for n.

The possible temperature-dependent cooling impulses per cycle are limited in time by a maximum total duration $t_{max}$. The maximum total duration $t_{max}$ correlates with the computed impulse duration $t_E$ in the following way:

$$t_{max} = K2 * t_E$$

whereby the following applies:

K2 is a constant satisfying the condition $(1-K1(j)) < K2 \leq 3$, K2=constant for all j's and $$t_E = \frac{K1(j)}{n} * \sum_{i=1}^{n} (t_{Ei} + t_{Vi}).$$

Said maximum cooling duration $t_{max}$ for the current cycle, which is in continuous correlation with the tempering history of the preceding n-cycles, prevents as a time limit of the temperature-dependent cooling impulse duration impulse lengths that could lead in the subsequent cycles to temperatures that are short of the nominal temperature. Impulse lengths of such a type are made possible, among other causes, by a position of the temperature sensors that may not be the optimal position, effecting an inertia in the measurement of the temperature conditions at the site of measurement, and thus a reaction to such inertia.

The time limit $t_{max}$ becomes effective for the first time in the second cycle after $T_{nom}$ has been exceeded the first time, because a computed tempering impulse $t_E$ is available only for said cycle. In the extreme case, the cooling duration for the first cycle after the nominal temperature has been exceeded may be identical with the time span from $Z_1$ to $Z_2$.

The maximum total duration $t_{max}$ of the temperature-dependent cooling impulses, which total duration is correlating with the computed impulse length, introduces in the cooling at the same time a cooling circulation-specific component because the calculation described above incorporates factors such as the cooling circulation development, position of the temperature sensors, media temperature, media volume and others. The process permits that if the tool temperature at time $Z_2$ of a number of successive cycles to be fixed is higher than the preset nominal temperature $T_{nom}$, i.e., if the available time span between $Z_1$ and $Z_2$ is not sufficient for cooling the tool temperature at the measuring site to the preset nominal temperature, the controller transmits the message "nominal temperature too low" for the respective cooling circulation. Correspondingly, the message "nominal temperature too high" is transmitted if the start-up phase is not completed after a number of cycles to be fixed, i.e., if the selected nominal temperature has not yet been exceeded after such number of cycles.

With respect to the signals from the machine operation control, which are used for the times $Z_1$ and $Z_2$, the following possibilities are available, by way of example:

The start of the after-pressure time is selected as time $Z_1$, and the end of the tool opening is selected as $Z_2$, or the start of the injection process as time $Z_1$ and the end of the tool opening as $Z_2$, or the Time $Z_1$ and the time $Z_2$ are fixed by the same signals of the machine operation control, whereby in this case, $Z_2$ is identical with the signal $Z_1$ of the subsequent cycle.

According to a further development of the process according to the invention, nominal temperatures preset outside the possible control range are corrected as follows: Following a fixed number $n_{error}$ of machine cycles in which the respective actual tool temperature remained constantly above or constantly below the preset nominal temperature $T_{nom}$, an error message is transmitted, as a consequence of which the limit temperature is determined in the direction of the preset nominal temperature by examining the mean temperature difference $T_{diff}$ at a defined time $Z_D$ in the machine cycle at $n_D$ consecutive cycles, whereby the limit temperature is determined with sufficient accuracy if the mean temperature difference $T_{diff}$ at time $Z_D$ at $n_D$ consecutive cycles is not greater than a temperature value $T_K$.

If the case occurs that the determined limit temperature is below the preset nominal temperature $T_{nom}$, the limit temperature is corrected downwardly by a temperature value $T_U$ and used as the new nominal temperature $T_{nom\text{-}corr}$, and the process-linked control parameter $t_{ann}$ is adapted by means of a factor from 0.2 to 0.8. If the determined limit temperature is above the preset nominal temperature $T_{nom}$, the cooling duration in the cycle is prolonged, whereby the signal $Z_2$ from the machine operation control of the injection molding machine, which signal terminates the tempering, is ignored and becomes equal to $Z_1$ of the subsequent cycle. If the extension of the cooling time is not sufficient, the determined limit temperature is corrected upwardly by a temperature value $T_O$ and $T_{nom\text{-}corr}$ is used as the nominal temperature.

Any time can be selected as the defined time $Z_D$ in the machine cycle; preferred in this connection are such signals from the machine operation control that are already available, such as, for example the start of the injection process, the beginning or end of the after-pressure time, and the end of the tool opening. With a stable process development and constant tempering (based on the limits found, cooling takes place either continuously or not), the temperature development across the cycle is nearly identical across several cycles if the limit has been found, so that the time for the determination of the difference is of no importance; under the technical aspect, a time is selected that is important for the process. The number of $n_{error}$-cycles to be fixed up to the error message should be in a range of 10 to 30 and depends on the width of variation of the process parameters. A smaller number $n_{error}$ can be selected for a process that is normally very stable. The cycle number $n_D$ for the determination of the mean temperature difference should be in a range of 2 to 30, whereby a greater influence of random variables has to be expected with a smaller number of cycles. With a greater number of cycles, the time component up to the initiation of a reaction by the process is of importance. The temperature value $T_K$ represents an absolute barrier for the mean temperature difference, and it can be assumed that the limit temperature has been reached if the value falls short of said barrier. A useful value for the temperature value $T_K$ is in a range of greater than zero to lower than 1 K. The temperature value $T_U$ should be in a range of 0.5 to 2 K, and the temperature value $T_O$ in a range of 1 to 5 K.

The reliability of the process can be enhanced by said further development of the process. When presetting nominal temperatures that are outside the control range, such temperatures are automatically corrected without intervention by the operating personnel. Such so-called "self-finding" of the control limits makes it possible to further reduce the reject quota in injection molding. Manual errors can be corrected in this way as well if an incorrect input of the nominal temperatures should occur.

Furthermore, a further advantage can be seen in the fact that it is possible for the operator to determine for certain cases of application the limit temperatures within which the process is applicable.

The sequence of self-finding of the control limits is as follows: A nominal tool temperature has been preset for the tempering system for a cooling circulation that cannot be achieved on account of the given circumstances such as, for example the tempering media temperature, the volume flow of the tempering media, or the temperature of the melt. Following a fixed number $n_{error}$ of machine cycles in which the respective actual tool temperature has constantly remained above or constantly below the preset nominal temperature $T_{nom}$, the tempering system transmits via a connected display a corresponding error message. Thereafter, the control system starts to search the limit temperature in the direction of the preset nominal temperature. At the same time, the actual tool temperature at a defined time $Z_D$ in the injection molding cycle is measured and the mean temperature difference $T_{diff}$ at $n_D$ successive cycles is computed. The limit temperature is deemed determined with sufficient accuracy if the mean temperature difference $T_{diff}$ at time $Z_D$ at $n_D$ successive cycles is smaller than a preset temperature value $T_K$. If the determined limit temperature is below the preset nominal temperature $T_{nom}$, said limit temperature is corrected downwardly by a temperature correction amount $T_U$ and used as the new nominal temperature $T_{nom\text{-}corr}$, and the process-linked control parameter $t_{ann}$ is reduced at the same time. If the limit temperature is above the not achievable nominal temperature $T_{nom}$, the possible cooling duration in the cycle is extended; the signal $Z_2$ from the operation control of the injection molding machine, which signals terminates the tempering, is ignored, and put equal the signal $Z_1$ of the following cycle. If such extension of the cooling time is insufficient for reaching the preset nominal temperature $T_{nom}$, the limit temperature set thereafter is correctly upwardly by a temperature value $T_O$ and used as the nominal temperature $T_{nom-corr}$.

In both limit cases, the process is capable of maintaining the newly preset nominal temperature $T_{nom-corr}$ and to control the interference quantities occurring in the injection molding process.

The process stability in injection molding is substantially increased by the tempering process according to the invention. As compared to the conventional tempering method it is possible to reduce the reject quota by up to 35%. Reductions in the cycle time of from about 5% to 15% lead to a considerable increase in productivity. Tempering appliances are required only if high cooling medium temperatures are required. Consequently, the specific energy consumption of the injection molding process is reduced by about 10% to 20%.

The device for carrying out the process has a controller, which is integrated in the injection molding process, the temperature measurement and the tempering medium flow control.

For said purpose, the controller consists of a adapter stage for adapting the thermal signals in accordance with the selected sensors and transmitting means to an after-connected analog-to-digital converter (ADC) for converting the thermal signals into electric signals; a central processing unit (CPU) for computing the required through-flow duration of the tempering medium in the respective cooling circulation ($K_1 \ldots K_m$) in dependence on the tempering events in the preceding cycles and the instantaneously measured temperature, and for transmitting switching signals at the start and end of the tempering medium through-flow to the control element ($M_1 \ldots M_m$) of the respective tempering circulation; an input unit for the input of signals from the operation control of the injection molding machine; and an output unit for guiding the operator, and an interface with the printer for recording the tempering events.

BRIEF DESCRIPTION OF THE DRAWINGS

The invention is explained in greater detail in the following by reference to the associated drawing, in which.

DETAILED DESCRIPTION OF THE PREFERRED EMBODIMENTS

Figure 1:
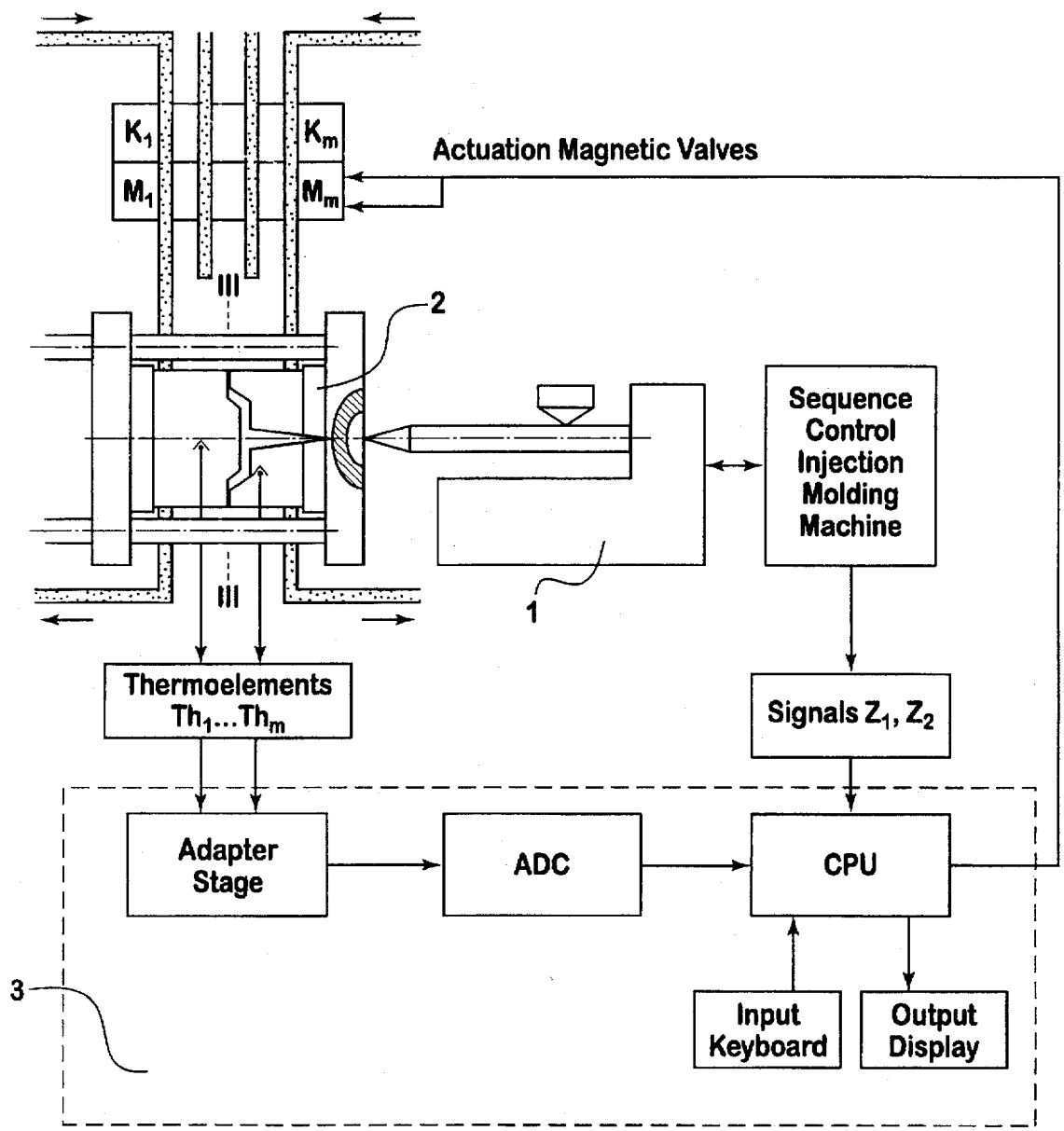
FIG. 1 shows a logicdiagram.

The logic diagram according to FIG. 1 shows an injection molding machine 1 with an injection molding tool 2.

Tempering of the injection molding tool 2 takes place via the cooling water circulations $K_1$ to $K_m$, whereby the through-flow of the cooling water can be interrupted or released for each cooling water circulation by means of the magnetic valves $M_1$ to $M_m$.

The controller 3 for the tempering of the tool consists of the assemblies adapter stage, analog-to-digital converter (ADC), central processing unit (CPU), input unit, output unit, and various interfaces. The individual assemblies are functionally integrated in said controller and thus in the system injection molding process, temperature measurement and adaptation of the tempering medium flow as follows:

For each cooling circulation $K_j$ (j=1, ..., m) of the injection molding tool, a thermosensor $Th_j$ (j=1, ..., m) is accommodated in the tool at a measuring site that is thermally equally acted upon by both the injected melt and the cooling, if possible within the range of the geometric center between the contour of the molded part and the cooling duct or cooling surface, and within the range of the center between the cooling medium inlet and the cooling medium outlet, such thermosensor being flexibly connected to the adapter stage of the controller. By the adapter stage, the thermal signals received by said stage are adapted to the connected analog-to-digital converter (ADC) in accordance with the selected sensors and transmission materials. Said ADC transmits the received thermal signals as electric signals to a central processing unit (CPU), where such signals are processed as explained in the following by reference to FIG. 2. In this connection, the software installed in the CPU determines, based on the temperature development in a fixed number of preceding cycles and the instantaneously measured temperature, the times for which the through-flow of the tempering medium is released in the respective cooling circulation.

The beginning and end of the tempering medium through-flow is fixed by the CPU by transmitting switching signals to the magnetic valve of the respective cooling circulation. The associability of measured values, computed results and cooling circulations is assured.

Connected to the CPU are also an input unit for the input of actuating variables, and an output unit for guiding the operator. The signals $Z_1$ and $Z_2$ supplied to the CPU from the operation control of the injection molding machine supply the time references to the injection molding process.

Figure 2:
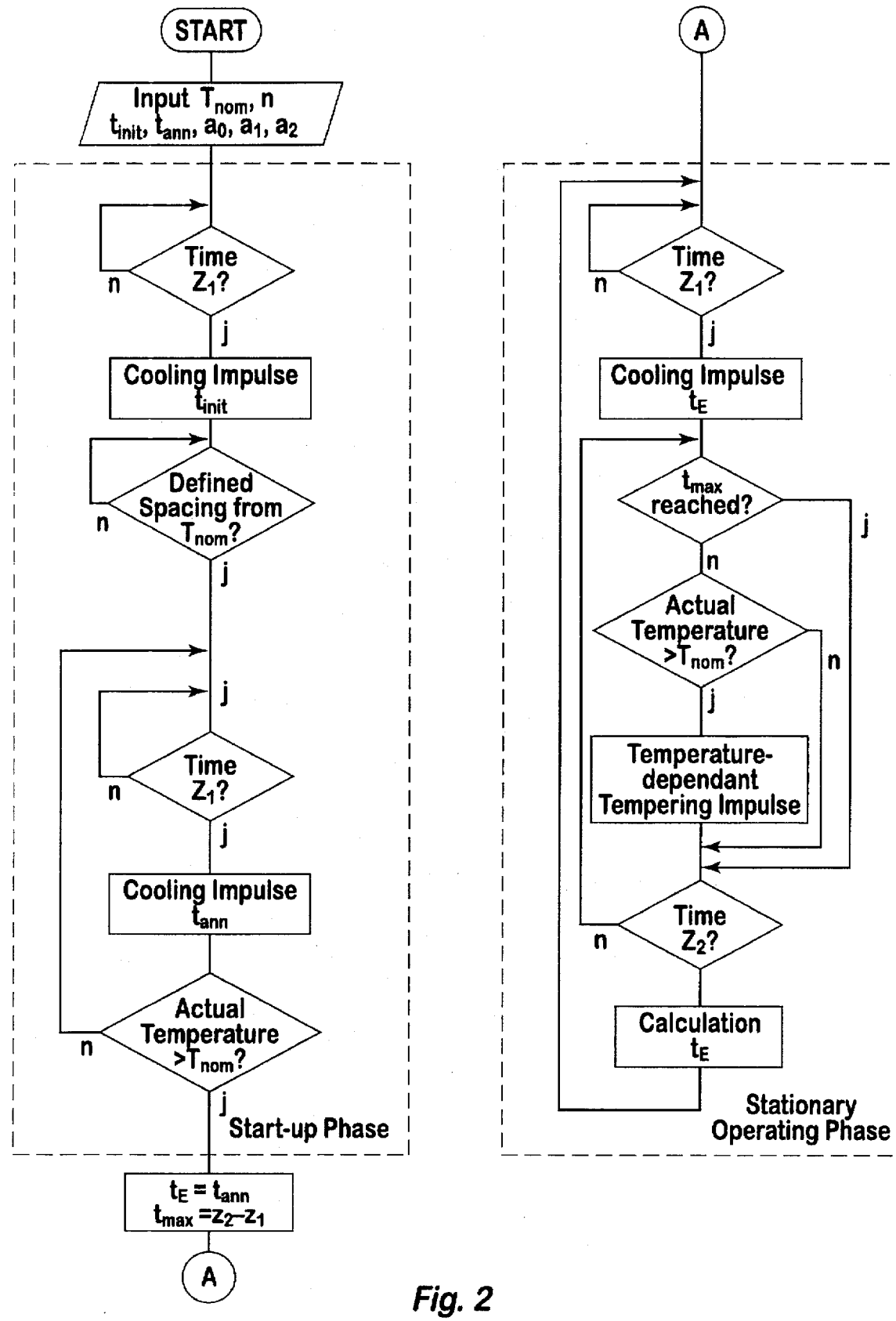
FIG. 2 shows a simplified program flowchart for the process according to the invention.

The program flowchart shown in FIG. 2 applies with respect to its sequence to each of the cooling circulations to be controlled, and has a cyclic sequence for each of said cooling circulations. The input of the nominal temperature via the input keyboard of the controller starts the tempering of the tool. The start-up phase begins with the first machine cycle after the start. The signal "time $Z_1$" of the operation control of the injection molding machine triggers the induction of the first impulse $t_{init}$.

In the further course, a comparison between the actual temperature and the preset nominal temperature is continuously carried out until a defined space to the nominal temperature has been reached. In the machine cycle following said event, the cooling impulse of length $t_{ann}$ is induced after the signal "time $Z_1$" has been received. Said induction at said time repeats itself in all subsequent cycles of the injection molding process with a continuous should be-actual comparison, and is carried out also in the cycle in which the preset nominal temperature $T_{nom}$ is exceeded for the first time. The start-up phase ends with the exceeding of the nominal temperature. In the first cycle of the stationary operating phase, the cooling impulse of length $t_{ann}$ is induced upon reception of the machine signal "time $Z_1$" as the initial value for the computed impulse $t_E$ for the last time; the total time span between $Z_1$ and $Z_2$ is preset as a possible temperature-dependent tempering duration for the first cycle of the stationary operating phase. If, upon induction of the computed impulse, the should be-actual comparison shows that the preset nominal temperature $t_{nom}$ has been constantly exceeded, or exceeded again, one or several temperature-dependent tempering impulses are induced for the duration over which the nominal temperature has been exceeded, but at the most up to the total duration $t_{max}$.

With the machine signal "time $Z_2$" at the latest the associated magnetic valve is closed, and the computing of the impulse $t_E$ as well as of the upper time limit $t_{max}$ for the possible temperature-dependent tempering impulses for the subsequent cycle starts. With the induction of impulse $t_E$, i.e., with the opening of the valve for the duration $t_E$ at time $Z_1$ of the subsequent cycle, tempering is continued.

Example 1

An automobile part is manufactured from ABS, Novodur PMT-S on an injection molding machine of type Billion 650. The process engineering parameters are as follows:

Mass of one shot (2 molded parts+sprue) : 0.920 kg

Tool mass : 3200 kg

Injection pressure : 500 bar

Injection time : 3.2 s

Closing force :6000 kN

Dwell pressure : 400 bar

Dwell pressure time : 7 s

The injection molding tool is equipped with four cooling circulations, which are coupled with the controller via thermo-sensors.

As nominal tool temperature $T_{nom}$, 50° C. is preset for the cooling circulations $K_1$ and $K_2$ (on the nozzle side), and 45° C. for the cooling circulations $K_3$ and $K_4$ (running side).

The tool temperatures within the range of the respective cooling circulations are measured in the geometric center between the cooling duct and the mold contour, and in the center between the cooling water inlet and the cooling water outlet of the respective circulation.

The way in which the bore receiving the sensor is arranged is described on the example of cooling circulation $K_1$: In the center between the cooling medium inlet and the cooling medium outlet, the bore is arranged two cooling ducts extending against each other and parallel with the tool contour, in the geometric center between the two ducts and perpendicular to the contour of the tool. The bore ends at half the spacing between the cooling duct and the tool contour before the tool contour. The concrete dimensions for the cooling circulation $K_1$ are as follows:

Center spacing between the two cooling ducts : 40 mm

Spacing between the center of the cooling duct and the contour : 40 mm

Spacing between the bottom of the duct and the contour : 20 mm

The bores required for measuring the temperature for the cooling circulations $K_2$, $K_3$ and $K_4$ were arranged analogous to circulation $K_1$.

The measurements are taken continuously over the entire duration of the cycle. As a reaction to the measured values, cooling medium impulses of a limited time duration are induced in the associated cooling circulation.

In the first cycle of the start-up phase, an initial cooling with a fixed duration $t_{init}$ takes place, starting at time $Z_1$ ("start of dwell pressure"), by which a first complete flushing of the respective cooling circulation is achieved. The duration of the initial cooling $t_{init}$ is fixed in each empirically based on the available empirical values, whereby 5 seconds is deemed sufficient for the present example.

In the following cycle, when a defined spacing of the measured mean tool temperature from the preset nominal temperatures of 3 K has been reached in the respective cooling circulations at time $Z_1$ ("start of dwell pressure"), a fixed cooling impulse $t_{ann}$ is induced over a time duration of 0.3 second. Said 0.3-second cooling impulse is induced in all subsequent cycles until the preset nominal temperature has been exceeded for the first time. When the nominal temperature has been reached or exceeded, the start-up phase is deemed completed, and the stationary operating phase follows. In the latter phase, a cooling medium impulse $t_E$ is induced at time $Z_1$, which impulse is computed as the mean value of the total cooling duration of the preceding three cycles, and evaluated with a factor K1 according to the following formula:

$$t_E = \frac{K1(j)}{n} * \sum_{i=1}^{n} (t_{Ei} + t_{Vi})$$

with n=3, whereby the following applies to K1(j):

$K1(j) = a_0 + a_1 * j$ for $j \leq 3$ $K1(j) = a_2$ for $j > 3$ $K1(j) < 1$ for $j > 0$.

Taking into account the thermal inertia of the heat transmission processes at the start of the stationary operating phase and the "overshots" in the temperature control frequently resulting therefrom, the following values were selected for the constants $a_0$, $a_1$ and $a_2$:

$a_0 = 0.3$; $a_1 = 0.1$; $a_2 = 0.75$.

For K1(j), the result is a monotonously growing development in dependence upon j, which assures that only after the cycle number n required for the computing of $t_E$ has been reached within the stationary phase, the tempering time mean is evaluated with generally acceptable validity.

Taking into account the number of the preceding cycles and the sum of the computed and temperature-dependent cooling impulses in the respective cycle, a cooling impulse duration $t_E$ is computed. For each cycle, $t_E$ is computed again via a computer, and the cooling impulse duration so determined is triggered.

Based on the computed results, the $t_E$-values are specified by way of example and for the 21st, 30th, 50th and 70th cycle of the cooling circulations $K_1$ and $K_4$.

As the result of the continuously occurring should be-actual comparison, one or several temperature-dependent cooling impulses with a maximum time duration—which is computed according to the formula $t_{max} = K2 * t_E$—are induced if the preset nominal temperature is exceeded up to time $Z_2$, the "end of the tool opening". In the present case, K2 is =1.5, and the values specified in the following table are obtained for the 21st, 30th, 50th and 70th cycles.

Tempering impulse duration (in seconds), tool temperature (in °C.) measured for cooling circulation $K_1$ (nominal temperature=50° C.), and for cooling circulation $K_4$ (nominal temperature=45° C.):

| Consec. cycle | Temperature at time $Z_1$ Cooling circulation | | Computed impulse duration $t_E$ | | Temperature-dependent impulse duration $t_V$ | | Temperature at time $Z_2$ | |
|---|---|---|---|---|---|---|---|---|
| | $K_1$ | $K_4$ | $K_1$ | $K_4$ | $K_1$ | $K_4$ | $K_1$ | $K_4$ |
| 21 | 49.7 | 45.1 | 6.0 | 3.6 | 1.5 | 1.4 | 49.8 | 44.8 |
| 30 | 50.0 | 45.3 | 5.1 | 4.0 | 2.5 | 2.0 | 49.9 | 45.0 |
| 50 | 49.8 | 45.2 | 5.2 | 3.3 | 1.7 | 1.8 | 50.0 | 45.0 |
| 70 | 50.0 | 45.1 | 5.4 | 4.6 | 1.9 | 1.5 | 50.1 | 44.8 |

All cooling circulations are fed with industrial water from the closed cooling water network of the plant, which has a temperature of 14° C. in the feed conduit. No use of a tempering appliance is required.

According to the process of the invention, the molded parts specified above were manufactured in a continuous operation with a cycle time of 43 s, in conformity with the quality requirements. The reject quota was found to come to 2.5%, and the specific energy consumption amounted to around 0.59 kWh/kg.

The self-finding of the control limits at a nominal temperature that was preset too high is explained in the following on the basis of cooling circulation 4. For cooling circulation 4 (running side), the operator preset a nominal temperature of 80° C.

In the first cycle of the start-up phase, the tempering system operates in accordance with the process, i.e., an initial cooling of the fixed duration $t_{init}$ takes place starting at time $Z_1$ ("start of dwell pressure"), by which a first complete flushing of the cooling circulation is achieved. In the further course, the cooling circulations 1, 2, 3 and 4 are controlled according to the process, i.e., no cooling takes place up to a temperature of $T_{nom}=3$ K. After 6 to 8 cycles, the temperature in circulations 1, 2 and 3 has exceeded the start-up limit, and after another two cycles the nominal temperature $t_{nom}$, which means the start-up phase has ended for said zones of the tool, and the stationary operating phase starts. Circulation 4 remains without cooling because the nominal temperature was preset too high. During a fixed cycle number $n_{error}=20$, an attempt is made to reach the preset nominal temperature $t_{nom}$ by further discontinuation of the cooling for circulation 4. Since the supply of heat to the measuring site is not sufficient for reaching the preset nominal temperature of 80° C., a corresponding error message is transmitted after 20 cycles via the display of the plant.

In the subsequent cycle, the system starts to find the limit temperature $T_{max}$ in the direction of the preset nominal temperature. For this purpose, the actual tool temperature at time $Z_D$ "end of the tool opening" ($Z_D=Z_2$) is measured, and the mean temperature difference of a number of 5 consecutive cycles ($n_D$) is determined. The limit temperature $T_{max}$ is deemed sufficiently accurate if the mean temperature difference $T_{diff}$ at time $Z_D$ "end of tool opening" of 5 consecutive cycles ($n_D$) is smaller than a preset temperature value $T_K$ of 0.5 K.

Twenty-seven (27) cycles after the beginning of the starting-up, the mean temperature difference came to 0.45 K, and the actual tool temperature at time $Z_D$ "end of tool opening" was 72° C. Said limit temperature was corrected from 72° C. to 71° C. by the correction value $T_U=1$ K, and recorded in the tempering system as the new nominal temperature $T_{nom\text{-}corr}$, and indicated to the operator. At the same time, the start-up impulse duration $t_{ann}$ was adapted and triggered as the first impulse of the stationary operating phase for a time duration of 0.1 second (adapted from 0.3 to 0.1 second).

EXAMPLE 2

Relay housings with 30% glass fiber reinforcement are manufactured on an injection molding machine of type Kl öckner Ferromatic FM 85. The process engineering parameters are as follows:

Mass of the shot (2 molded parts+sprue) : 0.130 kg
Tool mass : 270 kg
Injection pressure : 1200 bar
Injection time : 0.7 s
Closing force : 850 kN
Dwell pressure (stepped) : 1000 bar
Dwell pressure time : 6 s The process sequence is analogous to example 1; however, with the following differences occurring:

Conditioned by the high heat requirement of the cooling medium water (medium temperature 75° C.), it is necessary to use a two-circulation tempering system in order to maintain the required tool temperature.

For the two circulations of the tempering system, a nominal temperature of $T_{nom}=95°$ C. was preset on the nozzle side, and of 90° C. on the running side. For achieving a high heat discharge the time $Z_1$ was allocated to the process point "start injection process", taking into account the injection time of 0.7 s; the time $Z_2$ is identical with the time "end of tool opening".

Prior to the start of production, the tool is heated first for 20 minutes by means of the tempering device. With the start-up phase initiated thereafter, the stationary operating condition is reached as quickly as with the conventional procedure in spite of the lower temperature condition of the tool at the beginning.

In the start-up phase, the temperature point $T_{nom}=3$ K was reached already after 6 to 8 cycles; from said point on, tempering impulses $t_{ann}$ of 0.3 s length were induced at each of the times $Z_1$ of the individual cycles in order to effect a dampened reaching of $T_{nom}$. The start-up phase ended when $T_{nom}$ was reached.

For the stationary operating phase, the same control parameters n, K1 and K2 were used as in example 1. For producing the relay parts in the required quality, a cycle time of 47 s is required. The reject quota came to 1.75%, and the specific energy consumption amounted to around 0.65 kWh/kg.

EXAMPLE 3

On an injection molding machine of type Engel 7000/1000, molded parts "air conduction in the engine compartment" are produced from polypropylene EPDM with 20% talcum for the automobile industry.

The process engineering parameters are as follows:

Mass of one shot : 1.700 kg
Tool mass : 5500 kg
Injection pressure : 760 bar
Injection time : 5.3 s
Closing force : 10000 kN
Dwell pressure : 550 bar
Dwell pressure time : 7 s The process sequence is analogous to the one in example 1. The injection molding tool is equipped on the nozzle side with two coolingcirculations, for which the preset nominal temperature $T_{nom}$ is 45° C.

On the running side, the two slides of the tool are fitted with one cooling circulation, whose nominal temperature $T_{nom}$ is preset at 45° C.

Two additional cooling circulations are arranged within the zone of the punch of the tool; their nominal temperature $T_{nom}$ is preset at 55° C. Industrial water with a feed temperature of 16° C. is used as the tempering medium in all cooling circulations. Because of the relatively long injection time and in order to assure that the melt is injected onto the warm contour of the tool, time $Z_1$ was allocated to the process point "start of dwell pressure time"; hence cooling takes place only after the injection process is completed. Process point "end of tool opening movement" was selected as time $Z_2$.

A cooling impulse $t_{init}$ of 8 s duration was induced at the beginning of the start-up phase in all tempering circulations; starting with a tool temperature of 3 K below $T_{nom}$, tempering impulses $t_{ann}$ of 0.5 s duration were induced in each cycle at time $Z_1$. The start-up phase ended when $T_{nom}$ was reached. For the stationary operating phase, the same control parameters n, K1 and K2 were used as in example 1.

A cycle time of 56 seconds is required for producing the molded parts in the required quality. The reject quota came to 3.75%, and the specific energy consumption amounted to around 0.7 kWh/kg.

EXAMPLE 4

On an injection molding machine of type Engel ES 4400/800, molded plastic parts are manufactured from ABS "Ronfalin GG 70" for the inside door lining of a passenger motor vehicle. The process engineering parameters are as follows:

Mass of one shot : 1.310 kg

Tool mass : 4700 kg

Injection pressure : 650 bar

Injection time : 4.5 s

Closing force : 8200 kN

Dwell pressure : 340 bar

Dwell pressure time 7 s

The process sequence is analogous to the one in example 1. On the nozzle side, the injection molding tool is equipped with two cooling circulations, for which a nominal temperature $T_{nom}$ of 60° C. is preset. On the driving side, the two slides of the tool are equipped with one cooling circulation, for which a nominal temperature $T_{nom}$ of 50° C. is preset. Two cooling circulations are arranged in the remaining zone of the tool, for which a nominal temperature of 64° C. is preset. In all cooling circulations, separately treated industrial water is used as the tempering medium, with a feed temperature of 32° C., which water is used for the cooling of the machine and, on the return side, also for heating the room during the heating period via a special heat recovery plant.

Because of the relatively long injection time and also in order to assure that the melt is injected onto the warm tool contour, time $Z_1$ was allocated to the process point "start dwell pressure"; hence a cooling takes place only after the injection process has been completed. Because of the great mass of the molded part and the amount of heat thus introduced, as well as because of the relatively high temperature of the tempering medium, time $Z_1$ of the subsequent cycle was selected as time $Z_2$. Thus full exploitation of the cooling duration possible across one cycle is made possible, if need be.

At the start of the start-up phase, a cooling impulse $t_{init}$ of 10 s duration was induced in all tempering circulations; starting with a tool temperature of 3 K below $T_{nom}$, tempering impulses $t_{ann}$ of 1 s duration were induced in each cycle at time $Z_1$. The start-up phase ended when $T_{nom}$ was reached. For the stationary operating phase, the same control parameters n, K1 and K2 were used as in example 1.

A cycle time of 60 seconds is required for producing the molded parts in the required quality. The reject quota came to 3.6% and the specific energy consumption amounted to around 0.7 kWh/kg.

EXAMPLE 5

The self-finding of the control limits is explained in the present example. Manufacture of an automobile part, engine ventilation, from polyamide 6.6 with 20% glass fiber reinforcement, for the 1.6 L Opel, on an injection molding machine type Krauss-Maffei 150–620 B.

Process engineering parameters:

Tool design : two-fold

Mass of one shot (2 molded parts+sprue) : 204 g

Tool mass : 850 kg

Injection pressure : 920 bar

Cycle time :30 s

Injection time :1.8 s

Closing force : 1300 kN

Dwell pressure : 750 bar

Dwell pressure time : 5.5 s

The injection molding tool is equipped with four cooling circulations, which are coupled with the controlling unit via thermosensors. The associated software is installed in the central processing unit of the controller of the tempering system.

As the nominal tool temperature $T_{nom}$, 60° C. was preset for the cooling circulations 1 and 2 (nozzle side; 50° C. for the cooling circulation 3 (driving side); and 30° C. for cooling circulation 4 (driving side). The cooling medium is industrial water from a closed in-plant circulation with a feed temperature of 32° C.

The tool temperatures within the range of the respective cooling circulations are measured in the geometric center between the cooling duct and the mold contour, and in about the center between the cooling water inlet and cooling water outlet of each circulation.

At the beginning of the start-up phase, a cooling impulse $t_{init}$ of 5 seconds is induced in all four tempering circulations. Starting with a tool temperature of 3 K below the nominal temperature $T_{nom}$, tempering impulses $t_{ann}$ of 0.3 second are induced in each cycle at time $Z_1$. The cooling medium impulse duration $t_E$ induced in the stationary operating phase is 9 to 13 seconds for the cooling circulations 1 to 3, and 25 seconds for the cooling circulation 4.

In the first cycle of the start-up phase, the tempering system operates according to the process, i.e., starting at time $Z_1$ ("start dwell pressure"), an initial cooling with a fixed duration $t_{init}$ takes place, by which a first complete flushing of the cooling circulations is achieved. In the further course, the cooling circulations 1, 2, 3 and 4 are controlled according to the process, whereby the temperatures influenced by the circulations 1, 2 and 3 come smoothly closer to the respective nominal temperatures $T_{nom}$, whereas the tool temperature associated with circulation 4 shows a value above $T_{nom}$ already after the first cycle. During a fixed cycle number $n_{error}$=20, it is attempted to reach the preset nominal temperature $T_{nom}$ within the zone of circulation 4 by continuous cooling within the time available for such cooling between time $Z_1$ ("start dwell pressure") and time $Z_2$ ("end tool opening"). Since the cooling system is not capable of dissipating the required amount of heat, an error message is issued via the plant display. In the following cycle, the available cooling duration is prolonged by ignoring time $Z_2$ ("end tool opening") as the time limit for the cooling duration in this cycle. The time between the signal $Z_1$ of the current cycle and the signal $Z_1$ of the subsequent cycle is now available as the tempering duration. If this extension of the cooling time is not sufficient for reaching the preset nominal temperature $T_{nom}$, the limit temperature $T_{min}$ is determined in the direction of the preset nominal temperature. For this purpose, the actual tool temperature is measured at time $Z_D$ ("end tool opening" ($Z_D$=$Z_2$), and the mean temperature difference $T_{diff}$ is computed for 8 consecutive cycles $n_D$. The limit temperature $T_{min}$ is deemed sufficiently accurate if the mean temperature difference $T_{diff}$ at time $Z_D$ ("end tool opening") of 8 consecutive cycles is smaller than a fixed temperature value $T_K$=0.5 K. Since the determined limit temperature $T_{min}$ is above the preset nominal temperature $T_{nom}$, it is corrected upwardly by a temperature value $T_O=2$ K and used as the new nominal temperature $T_{nom\text{-}corr}$, which is indicated to the operator.

Twenty-nine (29) cycles after the beginning of the start-up, the mean temperature difference came to 0.48 K, and the actual tool temperature at time $z_D$ ("end tool opening") was 46° C. Said temperature was corrected by the above value $T_O$ to 48° C., entered in the tempering system as the new nominal temperature $T_{nom\text{-}corr}$, and indicated to the operator.

Comparative Example 1

Analogous to example 1, the molded parts are produced using the conventional tempering under the following tempering conditions:

Cooling method : 2 two-circuit accessory tempering devices

Cooling medium water

Cooling medium temperature : 2×45° C; 2×50° C.

Here, the required cycle time was 45 seconds. In a continuous operation, a reject quota of 3.7% was achieved; the specific energy consumption came to around 0.72 kWh/kg.

Comparative Example 2

Analogous to example 2, the molded parts were produced using the conventional tempering under the following tempering conditions, whereby the tool is tempered by means of two accessory tempering devices:

Cooling method : 2 two-circuit accessory tempering devices

Cooling medium : oil

Cooling medium temperature : 2×95° C. (nozzle side) 2×90° C. (driving side)

The required cycle time was 55 seconds. In a continuous operation, a reject quota of 2.7% was obtained; the specific energy consumption was around 0.72 kWh/kg.

Comparative Example 3

Analogous to example 3, the molded parts are produced using the conventional tempering under the following tempering conditions:

Cooling method : 2 two-circuit tempering devices

Cooling medium : water

Cooling medium temperature : 2×50° C.; 2×60° C. 2×14° C.

On the nozzle side in the sprue zone, continuous water cooling took place with 14° C. feed temperature via 2 cooling circulations. Two outer contour zones were tempered to 50° C. by means of a two-circuit tempering device (tempering medium: water). On the driving side, a two-circuit tempering device was connected, which tempered 2 slides by means of water to 50° C. Another two-circuit tempering device tempered the remaining zone of the punch by means of water to 60° C.

The required cycle time was 60 seconds. In a continuous operation, a reject quota of 4.7% was obtained; the specific energy consumption came to around 0.81 kWh/kg.

Comparative Example 4

Analogous to example 4, the molded parts are produced using the conventional tempering under the following tempering conditions:

Cooling method : 4 two-circuit tempering devices 1 cooling circulation with constant cooling Cooling medium : water Cooling medium temperature : 4×55° C; 2×50° C; 2×60° C. 1×14° C.

On the nozzle side, in the sprue zone, continuous cooling took place with industrial water from the in-plant network, with a feed temperature of 14° C.

The contour zones of the two-fold tool on the nozzle side each were tempered with a two-circuit tempering device. The temperature of the tempering medium was 55° C. in the return conduit. The driving side was tempered by means of two two-circuit tempering devices (tempering medium: water) as well, whereby the medium temperature was 50° C. within the zone of the slides that are more difficult to cool, and 60° C. in the remaining zones of the tool. The required cycle time was 64 seconds. In a continuous operation, a reject quota of 4.4% was obtained; the specific energy consumption came to around 0.88 kWh/kg.

As compared to conventional tempering, a clearly enhanced process stability is achieved by the process according to the invention. In addition to saving tempering devices; four in example 4, the important advantage lies in a reduction of the cycle time. According to the examples, such reduction is in the range of 4.5 and 14%. In this way, a substantial increase in productivity is achieved. Furthermore, it was possible also to considerably reduce the reject quota. In the examples, the savings achieved are in the range of 18 and 35%. Overall, this also results in a reduction of the specific energy consumption, which is between 10 and 20%.

A further saving of energy was obtained in example 4 by the fact that the separately treated industrial water, which is used for cooling the machine and, via a heat treatment plant, for heating the room, was simultaneously used for tempering the tool. This made it possible to introduce the amount of heat introduced by the melt into the tool—which heat is normally heat lost—for the major part via the tempering medium in the operational industrial water circulation, and to use such heat for heating the room during the heating period.

I claim:

1. A process for tempering an injection molding tool for processing plastics comprising the steps of:

dividing the tempering process into a start-up phase, and a stationary operating phase, the start-up phase being completed after the tool has been activated and a predetermined nominal tool temperature is reached or exceeded for a first time;

measuring the tool temperature continuously during an entire cycle at a site equally acted upon thermally for the respective cooling circulation by both the injected melt and the cooling, said site being located within a range of the geometric center between a molded part contour and cooling ducts, and within a range of the center between a cooling water inlet and cooling water outlet while maintaining a sufficiently large space from the molded part contour;

comparing the actual measured tool temperature to a predetermined nominal temperature value;

inducing a first cooling medium impulse into the injection process at a time $Z_1$ in order to effect a predetermined heat dissipation within the time range of the greatest temperature difference between the injected melt and the cooling ducts, the time $Z_1$ being fixed by a signal of a machine sequence control, said induction of the first cooling medium impulse being dependent on tempering of preceding cycles;

inducing additional cooling medium impulses into the injection process at a time $Z_2$ when a predetermined nominal temperature value has been exceeded, wherein time $Z_2$ is fixed by a signal of the machine sequence control, said signal being triggered at a defined time close in time to the end of the cycle.

2. Process according to claim 1, characterized in that during the start-up phase, an initial cooling $t_{init}$ with a fixed duration takes place in the first cycle starting at time $Z_1$ in order to achieve a first complete flushing of the respective cooling circulation, and upon reaching of a defined spacing of the mean tool temperature from the preset nominal temperature, a fixed cooling impulse $t_{ann}$ of a shorter time duration is induced in the subsequent cycle at time $Z_1$, whereby the cooling impulse $t_{ann}$ is induced in all subsequent cycles until the preset nominal temperature is exceeded for the first time, and a dampened approximation of the mean tool temperature to the selected nominal temperature is assured.

3. Process according to claim 1, characterized in that during the start-up phase, with presetting of a nominal temperature below the determined actual temperature, continuous cooling takes place at all subsequent times $Z_1$ and $Z_2$ until the measured actual temperature falls short of the preset nominal temperature for the first time, whereby upon falling short of the nominal temperature, the start-up phase is continued with the induction of the cooling impulse $t_{ann}$ at the time $Z_1$ of the cycle following the first falling short, and completed when the nominal temperature is exceeded again.

4. Process according to claims 1, characterized in that during the stationary operating phase following the time $Z_2$ of the respective cycle, the arithmetic mean of the total duration of the cooling medium impulses is computed by means of a computer based on the number n of the preceding cycles, evaluated with a factor K1, and the duration of the cooling medium impulse to be induced in the following cycle at time $Z_1$ is determined as value $t_E$, and upon induction of said cooling medium impulse, the induction of further temperature-dependent cooling medium impulses takes place up to time $Z_2$ of the current cycle as the result of the continuously executed should be-actual comparison, such further impulses being induced for the duration over which the nominal temperature is exceeded, their total duration per cycle being limited by the computed maximum duration $t_{max}$.

5. Process according to claim 4, characterized in that the time duration of the cooling impulse $t_E$ is determined according to the following calculation formula:

$$t_E = \frac{K1(j)}{n} * \sum_{i=1}^{n} (t_{Ei} + t_{Vi}). \qquad (I)$$

where n is the preset number of successive cycles whose total cooling duration is to be included in the calculation of $t_E$ after the preset nominal tool temperature has been exceeded for the first time;

$t_{Ei}$ is the cooling impulse computed for cycle i after n cycles;

$t_{Vi}$ is the sum of the temperature-dependent cooling impulses of cycle i of the n cycles;

j is the number of cycles after the phase of stationary operation has started; and K1(j) is the machine- and process-dependent quantity depending on j, which serves for evaluating the mean cooling time from the last n cycles and which satisfies the following conditions:

$$K1(j) = a_0 + a_1 * j \text{ for } j \leq n$$

$$K1(j) = a_2 \text{ for } j > n$$

$$K1(j) < 1, K1(j+1) \geq K1(j) \text{ for all } j\text{'s } a_0, a_1, a_2 > 0,$$

which means, $K_1(j)$ satisfies a straight-line equation for $j \leq n$, with $a_1$ as increase, $a_0$ as a constant member, and a strictly monotonously growing development within range $j \leq n+1$, for $j > n$, $K_1(j)$ is constantly $a_2$, whereby the following applies: $a_2 > a_0 + a_1 * j$ for $j \leq n$; and that it is assured that the sum of the cooling impulses up to cycle n is included less weighted in the calculation of $t_E$ than it is after n has been reached;

and that the following starting conditions apply to the calculation starting with cycle 1 of the stationary phase:

(1) $t_{Ei} = t_{ann}$ (2) The calculation of (I) is made for $j < n$ by substituting j for n.

6. Process according to claim 4, characterized in that the maximally possible sum of temperature-dependent cooling impulses is determined according to the following calculation formula:

$$t_{max} = K2 * t_E,$$

whereby the following applies:

K2 is a constant satisfying the condition $$(1 - K1(j)) < K2 \leq 3, K2 = \text{const. for all } j\text{'s;}$$

and $$t_E = \frac{K1(j)}{n} * \sum_{i=1}^{n} (t_{Ei} + t_{Vi}).$$

7. Process according to claim 1, characterized in that the start of the dwell pressure time is selected as time $Z_1$, and the end of tool opening is selected as time $Z_2$.

8. Process according to claim 1, characterized in that the start of the injection process is selected as time $Z_1$, and the end of the tool opening is selected as time $Z_2$.

9. Process according to claim 1, characterized in that the time $Z_1$ and the time $Z_2$ are fixed by the same signals of the machine sequence control, whereby $Z_2$ is identical with the signal $Z_1$ of the subsequent cycle.

10. Process according to claim 1, characterized in that following a fixed number $n_{error}$ of machine cycles in which the respective actual machine temperature remained constantly above or constantly below the preset nominal temperature $T_{nom}$, an error message is transmitted, as a consequence of which the limit temperature is determined in the direction of the preset nominal temperature by testing the mean temperature difference $T_{diff}$ at a defined time $Z_D$ in the machine cycle at $n_D$ successive cycles, whereby the limit temperature is determined with sufficient accuracy if the mean temperature difference $T_{diff}$ at time $Z_D$ at $n_D$ successive cycles is not greater than a temperature value $T_K$.

11. Process according to claim 1, characterized in that in case the determined limit temperature is below the preset nominal temperature $T_{nom}$, the limit temperature is corrected downwardly by a temperature value $T_U$ and $T_{nom-corr}$ is used as the new nominal temperature, and the process-linked control parameter $t_{ann}$ is adapted by means of a factor of 0.2 to 0.8.

12. Process according to claim 1, characterized in that in case the determined limit temperature is above the preset-nominal temperature $T_{nom}$, the cooling duration in the cycle is extended, whereby the signal $Z_2$ from the sequence control of the injection molding machine, said signal terminating the tempering, is ignored and equated with $Z_1$ of the following cycle.

13. Process according to claim 12, characterized in that with insufficient extension of the cooling time duration, the determined limit temperature is corrected upwardly by a temperature value $T_O$ and $T_{nom\text{-}corr}$ is used as the nominal temperature.

14. Process according to claim 1, characterized in that a value of between 10 and 30 is fixed for the cycle number $n_{error}$.

15. Process according to claim 1, characterized in that a value between 2 and 30 is fixed for the cycle number $n_D$.

16. Process according to claim 1, characterized in that the temperature value $T_K$ is in a range between greater than 0 and smaller than 1K.

17. Process according to claim 1, characterized in that the temperature value $T_U$ is in a range between 0.5 to 2K.

18. Process according to claim 1, characterized in that the temperature value $T_O$ is in a range of 1 to 5K.

19. A device for carrying out an injection molding process, with an injection molding tool fastened on the clamp plates of an injection molding machine, said tool having one or a plurality of tempering circulations of which the amount of through-flow is controllable, and in whose range of influence in the injection molding tool, a thermosensor is arranged for each tempering circulation, characterized in that a controller (3) consisting of an adapter stage for adapting thermal signals in accordance with selected sensors and transmission means to an after-connected analog-to-digital converter (ADC) for converting the thermal signals into electric signals; a central processing unit (CPU) for computing the required duration of through-flow of the tempering medium in the respective cooling circulation ($K_1 \ldots K_m$) in dependence on tempering events in preceding cycles and on the instantaneously measured temperature, and for transmitting switching signals at the start and end of the tempering medium through-flow to control element ($M_1 \ldots M_m$) of the respective tempering circulation; an input unit for the input of signals from the sequence control of the injection molding machine (1); an output unit for guiding the operator; and an interface for recording the tempering events on a printer, is integrated in the injection molding process, the temperature measurement and the tempering medium flow control.

* * * * *